United States Patent [19]

Nelson, III

[11] Patent Number: 5,087,865

[45] Date of Patent: Feb. 11, 1992

[54] POWER GOVERNANCE CIRCUITRY

[75] Inventor: James C. Nelson, III, San Antonio, Tex.

[73] Assignee: DAX Industries, Inc., Colorado Springs, Colo.

[21] Appl. No.: 660,437

[22] Filed: Feb. 22, 1991

[51] Int. Cl.$^5$ .............................. H02P 7/29
[52] U.S. Cl. ..................... 318/139; 388/831
[58] Field of Search ............... 318/139, 430, 434, 599; 388/804, 806, 811, 815, 819, 822, 829, 831, 833, 854

[56] References Cited

U.S. PATENT DOCUMENTS

| | | | |
|---|---|---|---|
| 3,569,810 | 3/1971 | Thiele | 318/434 X |
| 3,617,845 | 11/1971 | McKenna | 318/341 |
| 3,982,161 | 9/1976 | Grace | 318/257 |
| 4,309,645 | 1/1982 | DeVilleneuve | 318/341 |
| 4,508,999 | 4/1985 | Melocik et al. | 318/331 |
| 4,871,952 | 10/1989 | Ishizaka et al. | 388/829 |
| 4,906,906 | 3/1990 | Lautzenhiser et al. | 318/269 |
| 5,029,229 | 7/1991 | Nelson, III | 388/811 |

Primary Examiner—Bentsu Ro
Attorney, Agent, or Firm—Gunn, Lee & Miller

[57] ABSTRACT

The present invention provides solid state power controller governance circuitry which includes a power level select circuit, an power level transition circuit, a controlled power limiting circuit, and a power level transition reset circuit. The circuits together provides an analog voltage or resistance signal for input to a standard power controller device that allows not only for the efficient control of the power level in the powered device, but additionally provides for controlled power limiting to the powered device when changes in the function of the powered device are initiated, or when other conditions warrant rapid power limiting to the device. The circuits also provide means whereby the powered device may be appropriately re-powered from a zero power state after controlled power limiting has occurred. Together the circuits of the present invention provide a means whereby powered devices may be efficiently, smoothly, and safely operated by standard power motor controller circuits.

7 Claims, 5 Drawing Sheets

POWER GOVERNANCE CIRCUITRY

BACKGROUND OF THE INVENTION

1. Field of the Invention

The present invention relates generally to power regulator, governor and control devices. The present invention applies specifically to situations where less than the full power operation of a powered device is desired. The invention relates more specifically to devices which translate the discrete operation of mechanical controls into the efficient manipulation of power in a power operated device.

2. Description of the Related Art

Innumerable devices in society today consume power as they operate or function and perform work. This power is delivered to these devices in a great variety of forms. Power may, for example, be delivered to an operating device in the form of a pressurized liquid or gas. Once present within the device this pressurized liquid or gas can be utilized to do work. Power may also be delivered to an operating device by the conduction of electricity in a manner that results in a flow of current, the establishment of an electromotive force, or the establishment of a magnetomotive force. This conduction of electricity may be either direct or alternating in nature. Once present within the device this flow of current, electromotive force, or magnetomotive force can also be utilized to do work. But whether power is delivered by hydraulics, pneumatics, vacuum pressures, direct currents, alternating currents, static voltages, varying voltages, magnetics, or some other means for doing work, this delivery is always going to involve problems of efficiency and control.

The controlled delivery of power, regardless of the form that the power is delivered in, usually involves a number of common concerns. First is the manner in which power delivery is initiated. Second is simply the amount of power to be delivered, and the limitations on the power level as defined by the consumptive capacity of the device. Third is the manner in which a transition from one power level to another is achieved. Fourth is the manner in which a controlled limiting of power is achieved. The efficient use of power implies that a refined means for dealing with each of the above four concerns be implemented. The present invention seeks to address these concerns.

Because the delivery of power generally deals with the common concerns described above, regardless of the medium by which power is delivered, the discussion of a specific medium and system for the delivery of power can be easily translated into an analogous discussion involving a distinct medium and system. Thus while the present discussion will address the manifestations of the above described concerns primarily in the governance of electrical current, it should be apparent that the problems and solutions identified with regard to electrical current power systems, also identify analogous problems and solutions in areas where the delivery of power is achieved by other means.

The present discussion will therefore focus on the governance of electrical current, and will specifically address the governance of direct current to the motor of a motor driven vehicle. Electrically powered vehicles face each of the four concerns identified above. The transition from a stationary condition to a moving condition is important. The speed of the motion is important as is the maximum current flow to the motor. The acceleration and deceleration of the motion is important. And finally the controlled transition from a moving condition to a stationary condition is important.

The most common method of regulating the speed of an electric motor, and thus the speed of an electric vehicle, typically involves placing a variable resistor or a sequence of discrete resistors in series with the windings of the electric motor. While this method does provide speed control of the motor it has a number of distinct disadvantages.

First, the power drawn from the battery in such an arrangement is not efficiently reduced in direct proportion to the speed of the motor when the speed is reduced. This is because a portion of the power is dissipated through the resistors rather than entirely through the motor. The same current drain occurs on the battery whether the motor is run at high speed or low speed. The only change is in the relative distribution of the load between the resistors and the motor windings.

A second disadvantage, which is a by product of the first, is that the power dissipated through the resistors is given off as heat, which in addition to being a waste of energy, can create heat transfer problems in some applications.

A third disadvantage results from the inaccuracies associated with physically controlling the condition of a variable resistor or the selection of an array of discrete resistors. If the speed adjustment is accomplished by means of a variable resistor or potentiometer, then some physical movement of one contact across a resistive coil or surface will be required to provide the proper resistive input to a motor control circuit. If a series of discrete resistors is utilized, then a similar contact will have to be switched from one resistor to another, thereby presenting a resistance of a given value to the input of the motor control circuitry. In either case, there is seldom a smooth transition from one resistance value to another as the device is physically manipulated by a foot pedal or a hand control.

Electrically powered vehicles enjoy the advantage of being able to rapidly alter the current flow to the motor drive system and thus rapidly alter the motion of the vehicle. This advantage can become a disadvantage when such rapid changes result in problems associated with the control, stability, safety, and integrity of the vehicle.

Electrically powered vehicles such as forklifts and hand manipulated "walkies" are typically utilized within confined spaces and in direct contact with workers who may or may not be in control of the vehicle. These conditions raise additional safety concerns for both the vehicle and the workers. If the vehicle were to encounter a stationary, non-movable obstruction, the load placed upon the motor could draw a current in excess of the capacity of the motor or the control system. Some means of rapidly correcting or preventing such an overcurrent situation would be desirable.

Some electrically powered cargo moving vehicles are controlled by operators who walk behind the vehicle rather than ride on the vehicle itself. These "walkies" can potentially pin the operator between the vehicle and a stationary object. A safety switch known as a "belly" switch is typically incorporated into the hand controls of such vehicles and is designed to reverse the direction of he vehicle when a dangerous situation occurs. It would also be desirable to preserve the function of such safety devices in the control of the electric motor as well.

There is additionally no easy way of incorporating other velocity, acceleration, deceleration, or safety control means into the motor control circuitry. In many situations, there are other factors that can and should effect the function of the electric motor. Attempting to integrate all of these other control means in parallel with the primary speed control means of a variable resistor or a sequence of discrete resistors can be complicated if not impossible.

Attempts at solutions to the problems identified above have sometimes utilized solid state switching devices to control and regulate the current flow to the motor windings. One application of such a solid state device, a metal oxide semiconductor field effect transistor or MOSFET, is disclosed in U.S. Pat. No. 5,029,229. The power control circuit disclosed therein utilizes MOSFET devices to toggle on and off a relatively large current flow into a DC electric motor circuit.

While circuits of the type disclosed in the above referenced patent do provide an efficient way of controlling the current to a DC electric motor, they may still rely upon a variable resistance or variable voltage input for their own control or regulation. Such circuits solve the first two of the disadvantages identified above, but do not rectify the additional disadvantages that pertain to the inaccuracies associated with the standard variable resistor or multiple resistor input, and the inability to input parallel signals to control acceleration, deceleration, and sudden changes in direction, as well as overcurrent and safety conditions.

SUMMARY OF THE INVENTION

It is therefore an object of this invention to provide a reliable and efficient means of governing the delivery of power to a power consuming device.

It is a further object of this invention to provide a reliable and efficient means of governing the manner in which power delivery is initiated to a power consuming device.

It is a further object of this invention to provide a reliable and efficient means of governing the amount of power to be delivered to a power consuming device, and of respecting the power limitations of the power consuming device.

It is a further object of this invention to provide a reliable and efficient means of governing the transition from one power level to another in a power consuming device.

It is a further object of this invention to provide a reliable and efficient means of governing the manner in which a controlled limiting of power to a power consuming device is achieved.

Another object of the present invention is to provide a reliable and efficient means of controlling the effects of external factors on the function of powered devices in a manner that allows for their safe operation.

It is a further object of the present invention to provide an array of circuits that employ solid state switching devices to achieve the above stated objects, and at the same time are capable of being adapted to a number of different power controllers that may directly rely upon, or be adapted to rely upon, an analog electrical signal input for control.

In is also an object of this invention to achieve the above stated objects through a minimum of circuitry and in a manner that is both durable and versatile so as to be used in a wide range of applications.

The present invention provides solid state power governance circuitry which includes a power level select circuit, a power level transition circuit, a controlled power limiting circuit, and a power initiation reset circuit. The circuits together provide a variable voltage or variable resistance for input into a power controller device. The circuits allow not only for the accurate and smooth control of the powered device, but additionally provide for controlled power limiting when changes in the function of the powered device are initiated, or when conditions warrant the rapid but controlled limiting of the function of the device. The circuits also provide means whereby a power transfer unit, such as a motor, may be appropriately re-powered from a power off state after controlled power limiting has occurred. Together the circuits of the present invention provide a means whereby powered devices, especially those that require versatility of control, may be efficiently, smoothly, and safely operated by power controller systems.

BRIEF DESCRIPTION OF THE DRAWINGS

FIG. 3 is a circuit diagram of the controlled power limiting circuitry and the power initiation reset circuitry of the present invention.

DESCRIPTION OF A PREFERRED EMBODIMENT

Reference is first made in general to a DC control circuit appropriate for use in conjunction with the circuitry of the present invention. A number of such control circuits may be applicable if they regulate the delivery of power and rely on, or may be adapted to rely on, a variable resistance or a variable voltage for their own regulation. The circuit disclosed in U.S. Pat. No. 5,029,229 comprises a suitable DC control circuit appropriate for connection to the circuitry of the present invention.

The main function of most solid state DC controller circuits is in the regulation of a MOSFET, SCR, or other solid state switching device network, which network in turn controls the current flow through an external motor circuit. The current flow through the motor circuit determines the motor speed and thus the speed of the vehicle. In some controller circuits, the regulation of the switching network is accomplished by creating a modulated signal whose pulse width reflects the extent to which the governance circuitry (the present invention) directs an "on" or "off" condition (see FIG. 7). Thus, the ultimate goal of the controller circuit is to take an external analog voltage or resistance control signal provided by the appropriate governor circuitry (the present invention) and translate it into a pulse regulated flow of current through a DC motor circuit.

Typically, ancillary governor circuitry will establish a variable resistance or variable voltage between an input point and a common ground that increases or decreases according to the demands of the vehicle operation. The ancillary governor circuitry may typically provide a resistance to ground or an analog voltage that is inversely indicative of the desired drive on the vehicle/motor.

The governor circuitry of the present invention is connected to a controller circuit of the type described above at a single point. The circuitry of the present invention shown in FIG. 1, which provides the requisite analog signal to such a controller circuit, incorporates the functions of power level selection, power level transition control (acceleration), power limiting control (motor braking), and power initiation reset, all of which are connected through junction J1 to an appropriate input point in controller circuit of the type described above.

Composite Circuitry

Figure 1:
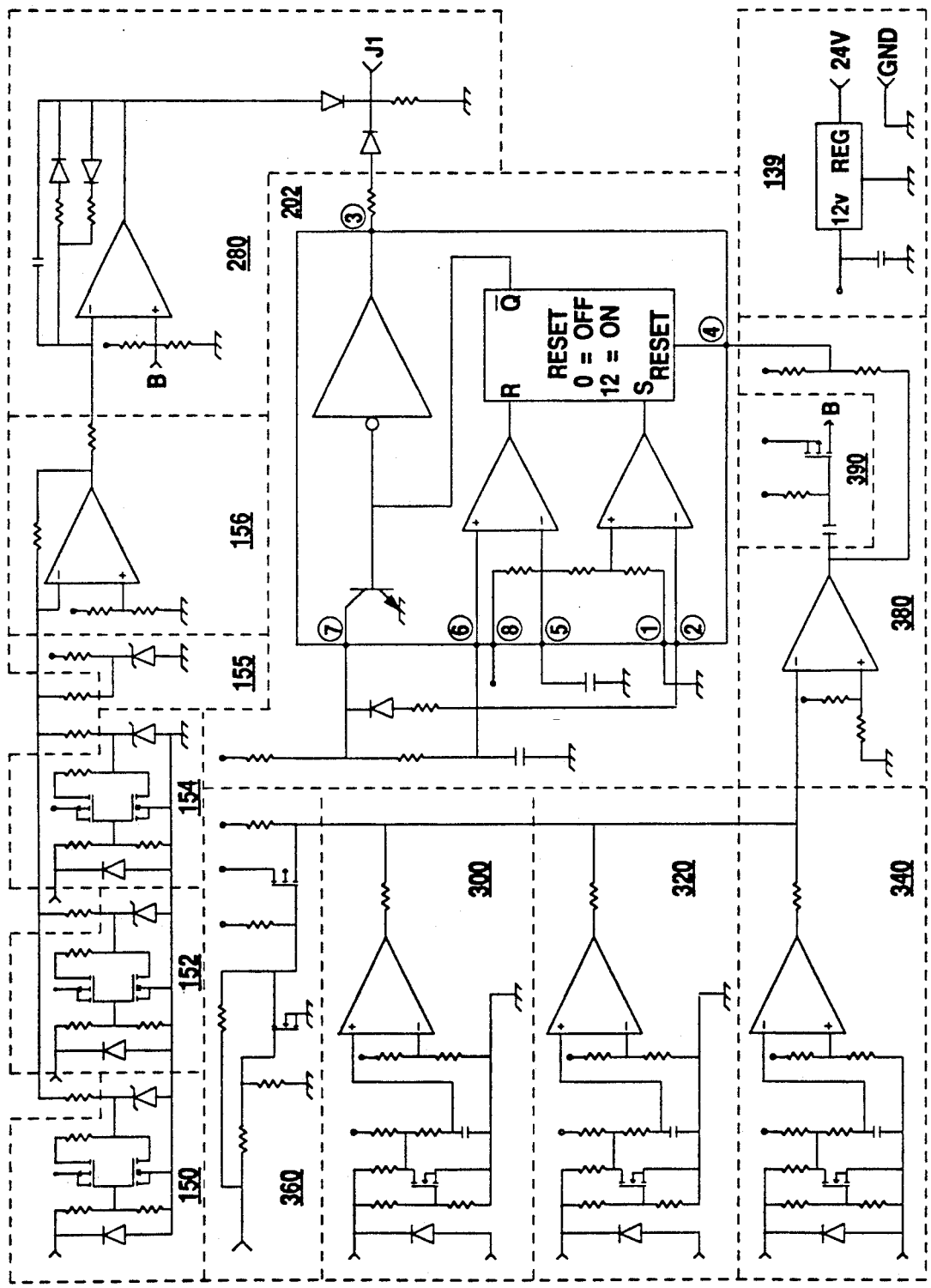
FIG. 1 is a composite circuit diagram of the power governance circuitry of the present invention.

Reference is first made to FIG. 1 for a composite circuit diagram of the controller governance circuitry of the present invention. FIG. 1 does not describe in detail the specific components of the various circuits of the present invention, but rather describes the functional sub-circuits which go into the overall composite circuit.

The governance circuitry of the present invention may be connected to a DC motor controller circuit (not shown) at junction J1. Junction J1 is the output for power level transition circuit 280, as well as the output for the controlled power limiting function seen through pulse width modulator circuit 202. Power level transition circuit 280 controls the rate at which a voltage is brought to a level indicative of the speed selected by the vehicle operator. Circuit 280 also controls the rate of decrease in velocity when a lower speed is selected by the operator. Power level transition circuit 280 also receives a signal from power initiation reset circuit 390 that indicates controlled power limiting activity has ceased, and the vehicle may then power up from a zero velocity state. Power level transition circuit 280 receives this signal form power initiation reset circuit 390 via connection B.

Power level transition circuit 280 receives the power level (speed) selected by the operator form power level adder circuit 156. Power level adder circuit 156 cumulates the effects brought about by a selection on the external controls of the vehicle, through power level select circuits 150, 152, and 154 and adder biasing circuit 155. In the preferred embodiment, this group of three power level select circuits incorporate low power circuit 150, medium power circuit 152, and high power circuit 154. Typically, low power incorporates only the functioning of low power circuit 150, medium power results from the cumulative effect of activating both low power circuit 150, and medium power circuit 152, and high power is the cumulative effect of all three power level select circuits. Adder biasing circuit 155 provide a baseline voltage to which circuits 150, 152, and 154 add to.

The controlled power limiting function of the present invention is achieved primarily by pulse width modulation circuit 202. The functional output of pulse width modulation circuit 202 is a pulsed waveform of a duration appropriate for the gradual decrease in the power level of the vehicle. Pulse width modulation circuit 202 is started by a signal from comparator circuit 380. Comparator circuit 380 is controlled by a plurality of controlled power limiting event circuits 300, 320, 340, and 360. In a preferred embodiment forward circuit 300 is engaged when the powered vehicle is in the forward configuration and a forward solenoid (not shown) is active. Reverse circuit 320 is engaged when the powered vehicle is in reverse, and a reverse solenoid (not shown) is active. Power limitation circuit 340 is engaged when there is an overpower condition in the motor that requires a controlled power. Safety switch circuit 360 incorporates a means for over riding circuits 300, 320, and 340, so as to preserve the original safety functions present in the vehicle.

The specifics of each of the above referenced subcircuits are described in more detail below. One additional circuit not mentioned above but indicated in FIG. 1 is voltage governance circuit 139 that provides the operational 12 volts DC that the controller circuit and the circuitry of the present invention require from a typical DC battery that most electric vehicles use to function. The controller circuitry and the governance circuitry of the present invention may typically be used with batteries ranging from 6 volts to 600 volts with operational voltages in the range of 3 volts to 120 volts.

Power Level Select Circuitry

Figure 2:
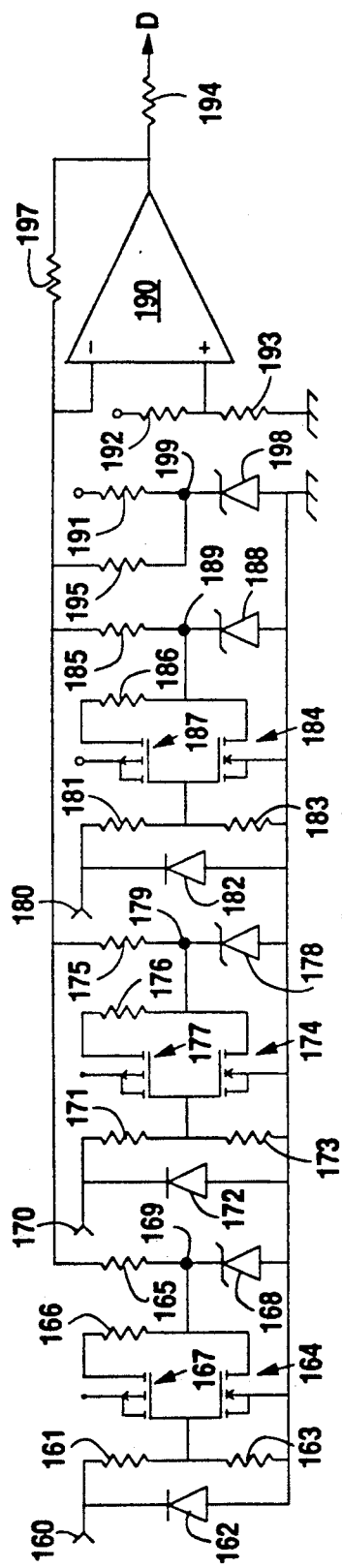
FIG. 2 is a circuit diagram of the power level select circuitry of the present invention.

The power level input of a typical solid state DC controller is provided with a voltage from power level transition circuit 280 that under ordinary circumstances is determined by the power level select circuitry shown in FIG. 2. The power level select circuitry is comprised of low power circuit 150, medium power circuit 152, high power circuit 154, adder biasing circuit 155, and power level adder circuit 156.

Power level circuits 150, 152, and 154 are in progressive combination provided with the battery voltage of the powered device at 160, 170, or 180, according to the power level selected by the vehicle operator. Diodes 162, 172, and 182 serve as spike suppressors for their respective circuits. When power level circuits 150, 152, and 154 are not "activated" by a battery voltage at 160, 170, or 180 respectively, FET devices 167, 177, and 187 provide a steady state voltage that in turn provides an "output" voltage at points 169, 179, and 189, equal to the voltage rating of zener diodes 168, 178, and 188. In the preferred embodiment, these diodes are each 2 VDC diodes. Adder biasing circuit 155 provides a base voltage to which voltage from circuits 150, 152, and 154 are added. In the preferred embodiment, zener diode 194 maintains a base biasing voltage at 6 VDC at point 199. Pull up is provided by resister 191.

Thus, with no power level selected, the circuits 150, 152, 154, and 155, provide k2 VDC, 2 VDC, 2 VDC, and 6 VDC respectively, to power level adder circuit 156. This total of 12 VDC equals the voltage at the positive input of adder 190, as biased by resistor pair 192/193.

When the power level circuits 150, 152, and 154 are "activated" by a battery voltage at 160, 170, or 180 respectively, the gates of FET devices 164, 174, and 184 are provided with a voltage divided by resistor pairs 161/163, 171/173, and 181/183. This voltage switches FET devices 164, 174, and 184 into a conducting state, which provides an "output" voltage at points 169, 179, and 189 equal to 0 VDC. In the preferred embodiment, therefore, the total voltage cumulated by adder 190 is 2 VDC less for each circuit 150, 152, and 154, that has been activated. This means that the voltage seen at the negative input of adder 190 proceeds in step-wise fashion from 12 VDC to 10 VDC to 8 VDC to 6 VDC.

In this preferred embodiment, resistors 165, 175, 185, 195, and 197 (the feedback for adder 190) are of equal value. Other well known solid state and non-solid state switching devices could be utilized in place of FET devices 164/167, 174/177, and 184/187.

Power level circuits 150, 152, 154, and adder biasing circuit 155 together provide a specific selected voltage to power level adder circuit 156. This voltage at the negative input of adder 190 is distinctive of high, medium, or low power level selection, and is compared with the positive input voltage. The output is the difference between these two input voltages. Operational adder 190 has a positive input biased by the resistor pair 192/193, wherein resistor 192 is tied to +12 VDC and resistor 193 is tied to ground. Operational adder 190 has feedback resistor 197 and provides an output voltage through resistor 194.

In the preferred embodiment, resistor pair 192/193 biases the positive input of adder 190 to a 6 VDC. The step-wise transition, therefore, of the negative of adder 190 from 12 VDC down to 6 VDC, therefore results in an output from power level adder circuit 156 that progresses in step-wise fashion from 0 VDC up to 6 VDC, with 0 VDC indicating a full off condition, and 6 VDC indicating a full on condition. This step-wise progressive of voltage from power level adder circuit 156 is then provided to power level transition circuit 280, which is described in more detail below.

Controlled Power Limiting Circuitry

Reference is now made to FIG. 3 for a description of the circuitry which determines when controlled power limiting should be initiated. Controlled power limiting refers to the process of controlling the deceleration of the vehicle during a transition form a positive/forward direction to a negative/reverse direction, or vice versa, by controllably reducing power before a switch over is made. Controlled power limiting may also be designed to occur when power limitation factors or other external factors on the vehicle demand a rapid but controlled braking of the motor and vehicle. Overpower is just such a limitation factor, and calls for controlled power limiting when the drive motor circuit (not shown) is loaded in a manner that draws too much power. This can occur if the vehicle encounters a significant resistance to its forward or reverse motion. In the preferred embodiment there is also a safety circuit that integrates the action of a "belly" switch in to the controlled power limiting function. The controlled power limiting circuitry works in conjunction with power initiation reset circuitry 390 to achieve the controlled transition appropriate to handle each of the above described situations.

Forward circuit 300, reverse circuit 320, and power limitation circuit 340, are each similar circuits whose characteristics may be adjusted, according to the specific application that the circuit is intended for. In general, circuits 300, 320, and 340, are designed to take resistors 317, 337, and 357, in and out of a voltage dividing pair with resistor 383. This arrangement determines when comparator 382 in comparator circuit 380 toggles. When the toggle occurs, this is a signal to initiate controlled power limiting.

When the vehicle is in the forward configuration, the forward solenoid coil is energized. This is sensed at terminal 303. Terminal 305 provides a connection to the solenoid return and connects diode 306 which serves to suppress voltage/current spikes generated in the solenoid coil. A high voltage (battery) is thus seen at terminal 303, and is subsequently divided by resistors 307 and 308 to energize the gate of field effect transistor (FET) 309. When energized, FET 309 provides a path to ground for resistor 311, which is connected to +12 VDC. Capacitor 313, which had previously been charged through resistors 311 and 312, now discharges through resistor 312. It is important to note that the discharge time of capacitor 313 is less than the charge time. This means that when a switch is made from activation of forward circuit 300 to activation of reverse circuit 320, or vis versa, the second circuit comes on before the first circuit turns off.

The negative input of comparator 302 is biased at a voltage determined by resistor 314 and resistor 315. The output of comparator 302 is toggled high or low to bring resistor 317 out of, or into, a voltage divider pair with resistor 383. Comparator 302 is toggled low when the forward solenoid is energized, which puts resistor 317 into circuit and provides a specific voltage to comparator 382 that is above the toggle threshold of comparator 382.

When the vehicle is in the reverse configuration, the reverse solenoid coil is energized. This is sensed at terminal 323. Terminal 325 provides a connection to the solenoid return and connects diode 326 which serves to suppress voltage/current spikes generated in the solenoid coil. A high (battery) voltage is thus seen at terminal 323, and is subsequently divided by resistors 327 and 328 to energize the gate of field effect transistor (FET) 329. When energized, FET 329 provides a path to ground for resistor 331, which is connected to +12 VDC. Capacitor 333, which had previously been charged through resistors 331 and 332, now discharges through resistor 332. It is important to note that the discharge time of capacitor 333 is less than the charge time. This means that when a switch is made from activation of reverse circuit 320 to activation of forward circuit 300, or vice versa, the second circuit comes on before the first circuit turns off.

The negative input of comparator 322 is biased at a voltage determined by resistor 334 and resistor 335. The output of comparator 322 is toggled high or low to bring resistor 337 out of, or into, a voltage divider pair with resistor 383. Comparator 322 is toggled low when the reverse solenoid is energized, which puts resistor 337 into circuit, and provides a specific voltage to comparator 382 that is above the toggle threshold of comparator 382.

Power limitation circuit 340 is connected so as to function somewhat differently from forward circuit 300 and reverse circuit 320. In power limitation circuit 340, a voltage is provided at terminal 343 with respect to common terminal 345, that is across a shunt resistor (not shown) and is indicative of the current flow in DC motor control circuit (not shown). In an overpower situation, a voltage (0.25 VDC in the preferred embodiment) is seen at terminal 343 which is normally at 0 VDC. Diode 346 ensures the proper current flow in power limitation circuit 340. A non zero voltage at terminal 343, therefore, provides a voltage at the negative input of comparator 342 by way of resistor 350 and RC pair 352/353. This input causes comparator 342 to toggle low, which brings resistor 357 into a voltage divider pair with resistor 383. This provides a specific voltage to the negative input of comparator 382 that is below the toggle threshold of comparator 382.

Safety circuit 360 is designed to sense when a "belly" switch has been thrown on a "walkie" type vehicle. A "belly" switch (not shown) is a safety device that prevents a hand manipulated powered vehicle from pinning the operator against a stationary object such as a wall. Such a switch is typically on the handle of manually operated vehicles, and is a contact switch that engages the belly of the operator when the operator is placed between the vehicle and a stationary object. This immediately reverses the direction of the vehicle (by means not covered herein) so as to prevent the operator from being pinned and being injured.

The "belly" switch circuit shown in FIG. 3 is capable of functioning with either a switch that pulls junction 363 to high (the battery voltage of powered device) or to ground. If the switch pulls 363 to high, a voltage divider pair made up of resistors 367 and 368 provides a voltage to the gate of FET device 369. The switching on of FET device 369 brings the gate of FET device 372 to ground, which turns FET device 372 on, and shows a +12 VDC to the negative input of comparator 382. This voltage overrides any voltage created by the other controlled power limiting event circuits, and immediately terminates the controlled power function so as to allow the vehicle to reverse direction, and move out of the unsafe situation without calling for controlled power. Resistor 370 is not used in the case of a switch of junction 363 to high.

If the safety switch (not shown) pulls point 363 to ground, then resistor 370 is pulled into series with resistor 371, which provides a low voltage at the gate of FET 372, which causes FET 372 to conduct and show a +12 VDC to the negative input of comparator 382. Resistor 370 should have a low resistance in this case. Resistors 367 and 368, and FET device 369 are not used.

When the vehicle is in motion either resistor 317 or resistor 337 is pulled to ground. Resistor 317 and 337 are equal in the preferred embodiment. When a second one of circuits 300, or 320 is engaged, which indicates a directional motion change, then the corresponding resistor 317, or 337 is placed in a voltage divider with resistor 383 in addition to the one resistor 317 or 337 already in circuit. The combination of two parallel resistors to ground in circuit creates a voltage at the negative input of comparator 382 which is below the toggle threshold of comparator 382, which in turn initiates controlled power limiting. When the vehicle is switched from forward to reverse, or vice versa, capacitors 313 and 333 prevent the immediate release of resistors 317 or 337, as the case may be, long enough for controlled power limiting to be initiated. Resistor 357 is half the value of 317 or 337, and therefore, alone in circuit with resistor 383 produces a voltage at the negative input of comparator 382 that is below the threshold of toggle comparator 382 and triggers controlled power limiting. The controlled power limiting circuitry is described in more detail below.

Comparator 382 is biased at its positive input by resistor pair 385/384 at a voltage that controls the toggle of comparator 382 to occur above the point at which resistors 317, and 337 have together been put into circuit with resistor 383. Either of these resistors 317, or 337 by itself with resistor 383 is not enough to cause comparator 382 to toggle.

Figure 4:
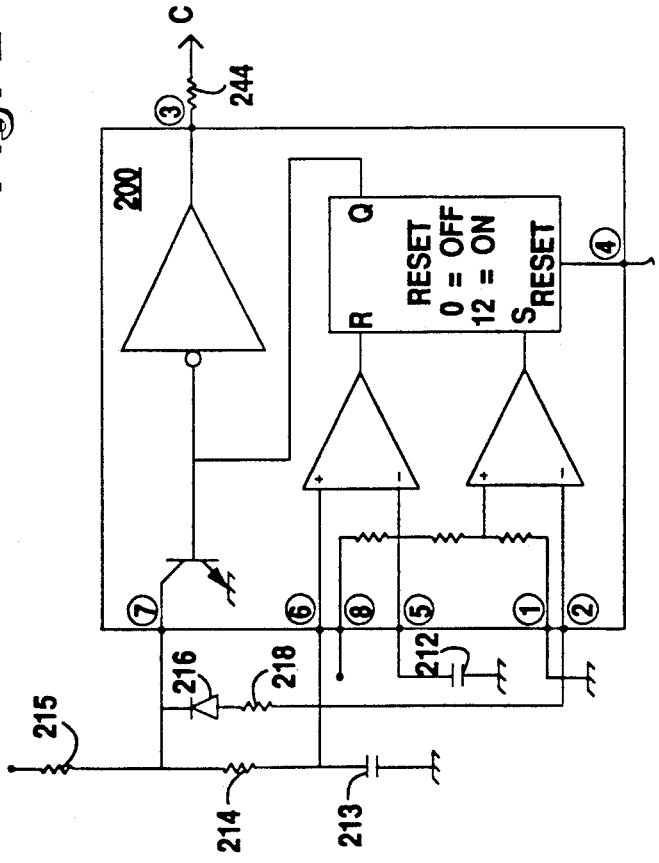
FIG. 4 is a circuit diagram of the pulses width modulation circuitry of the present invention.

Reference is now made to FIG. 4 for a description of the pulse width modulation (PWM) circuitry of the present invention which receives the signal to initiate controlled power limiting and produces the pulsed waveform output that results in controlled power limiting. The output PWM circuit 202 is provided to junction J1 through diode 252. PWM circuit 202, is composed primarily of timer circuit 200. Timer circuit 200 is an NE555 timer connected in a pulse width modulator configuration with its reset terminal (4) driven by the output of comparator circuit 380 through voltage divider pair 386/393. A PWM circuit alternates between two unstable states, and creates a sequence of pulses at a desired frequency and band width. This output of the NE555 circuit is then provided to the controller circuitry (not shown).

PWM circuit (NE555) 200 is externally biased across terminals (7) and (6) by resistor 214, is provided with +12 VDC at terminal (8), has terminal (7) pulled up to +12 VDC through resistor 215, has a control voltage maintained by capacitor 212 at terminal (5), has a voltage maintained at terminal (2) by capacitor 213, and is grounded at terminal (1). The trigger at terminal (2) is connected to the discharge terminal (7) by way of resistor/diode pair 218/216, and is additionally tied to threshold terminal (6). Appropriate biasing values may be chosen according to standard NE555 timer specifications that will provide a PWM signal at the output (terminal (3)) that toggles low (an "on" motor condition) for anywhere from 0–5% of the cycle and high (an "off" motor condition) for the balance of the cycle.

Once the velocity of the vehicle has dropped to zero, the reset voltage provided to PWM circuit 200 at its reset terminal (4) from circuit 380, again goes low.

Power Initiation Reset Circuitry

Reference is now made again to FIG. 3 for a description of the power initiation reset circuitry of the present invention. Power initiation reset circuitry 390 is comprised of capacitor 396, pull-up resistor 397, and FET device 398. The RC combination 396/397 is designed not to alter the steady state conducting characteristics of FET device 398 when a toggle of comparator 382 goes from low to high, which initiates controlled power limiting. The RC pair 396/397 sends a low voltage spike to the gate of FET device 398 when comparator 382 toggles from high to low. This low voltage spike switches FET device 398 into a momentary conductive state, which (via connection B) drives the positive input of integrator 392 high long enough to reset its output, and allow for the controlled re-acceleration of the motor from a zero velocity state.

Power Level Transition Circuitry

Figure 5:
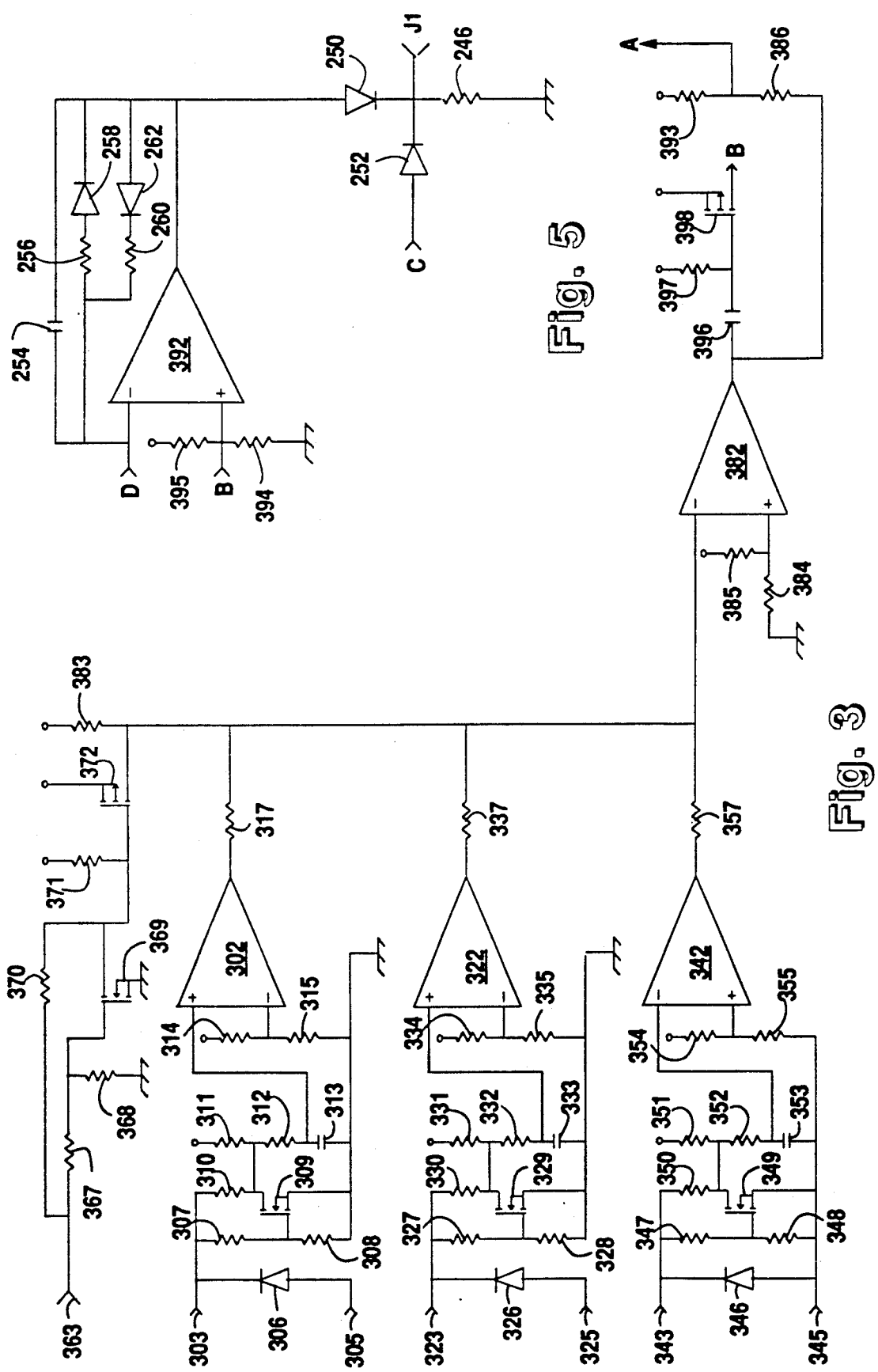
FIG. 5 is a circuit diagram of the power level transition circuitry of the present invention.

Reference is now made to FIG. 5 for a description of the power level transition circuitry, and the means whereby the voltages presented by the various ancillary circuits described above are incorporated into a single input into the DC motor control circuitry (not shown). The core of power level transition circuitry 280 is integrator 392. Integrator 392 is provided a voltage signal from the power level adder circuit 156 at its negative input through junction D. The positive input of integrator 392 is ordinarily biased by resistor pair 395/394. When power initiation reset circuit 390 activates its momentary low voltage spike the positive input of integrator 392 is made to go high long enough to reset the power level to zero and restart the power level transition curve.

The slopes of the positive and negative power level transition curves, are determined by the characteristics of the resistors and capacitors in the feedback loop for integrator 392. The values for capacitor 254 and resistors 256 and 260 are selected so as to provide a controlled voltage change at the output of integrator 392 in response to the input voltage from power level select circuitry 156. Diodes 258 and 262 ensure that the proper resistor is in circuit for either a positive power level transition (acceleration) or a negative transition (deceleration). This allows for an acceleration rate distinct from the deceleration rate. The output of integrator 392 is then provided to junction J1 through diode 250, and provides the control circuitry (not shown) an analog voltage indicative of the power level selected.

The controlled power limiting function itself, as mentioned above, is seen directly at junction J1 from the output of PWM circuit 202. Diode 252 is in line with PWM circuit 202 through to junction C. The output through diode 252 interacts with the output through diode 250 such that the higher analog voltage signal is passed to junction J1. That is, when the controlled power limiting function is not operating and the output through diode 252 is low, junction J1 sees only the analog voltage output through diode 250 from power level transition circuit 280. When a controlled power limiting function is operating, then the waveform at diode 252 is a pulsed waveform that alternates between a short band width low state, and a large band width high state. This waveform is affected by the analog voltage level through diode 250. The analog voltage level through diode 250 serves to prevent the low section of the pulsed waveform through diode 252 from dropping below a value indicative of the power level selected. This ensures that the controlled power limiting signal does not ignore the power level selected at the time controlled power limiting is initiated. In other words, if the power level selected is already low, the controlled power limiting signal incorporates this low power level into its pulsed waveform signal. Likewise, if the power selected is high, the controlled power limiting signal incorporates this high power level in its pulsed waveform. The effect is seen more clearly in FIGS. 6 through 9 discussed below.

Figure 6:
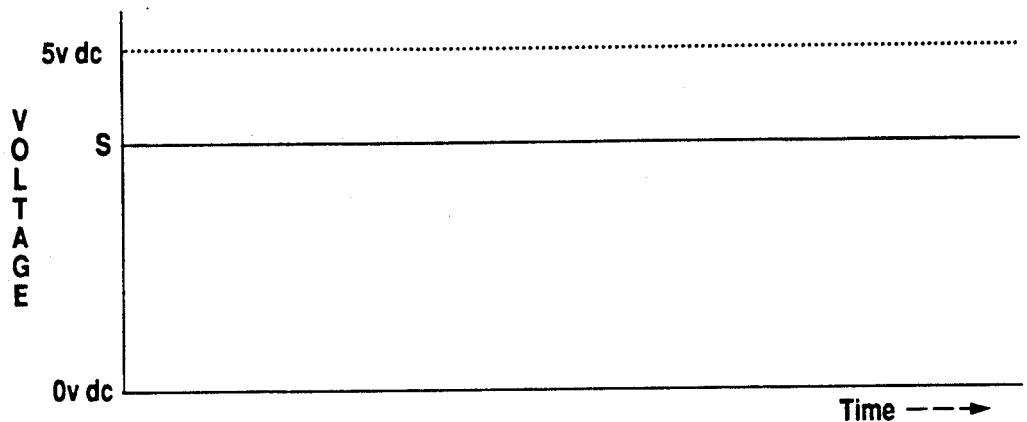
FIG. 6 is a graphic representation of the output from the circuitry of the present invention when the powered device is in a normal, partial power, functional configuration.

FIG. 6 is a graphic representation of the analog output at J1 from the circuitry of the present invention when the powered device is in a normal, partial power, functional configuration. This voltage is seen when a relatively low power has been selected by the operator. This low power is reflected by a voltage that is closer to 5 VDC (full off) than to 0 VDC (full on), and is shown as constant after having been brought up gradually by power level transition circuit 280. A higher power level would be indicated by a lower constant voltage at junction J1.

Figure 7:
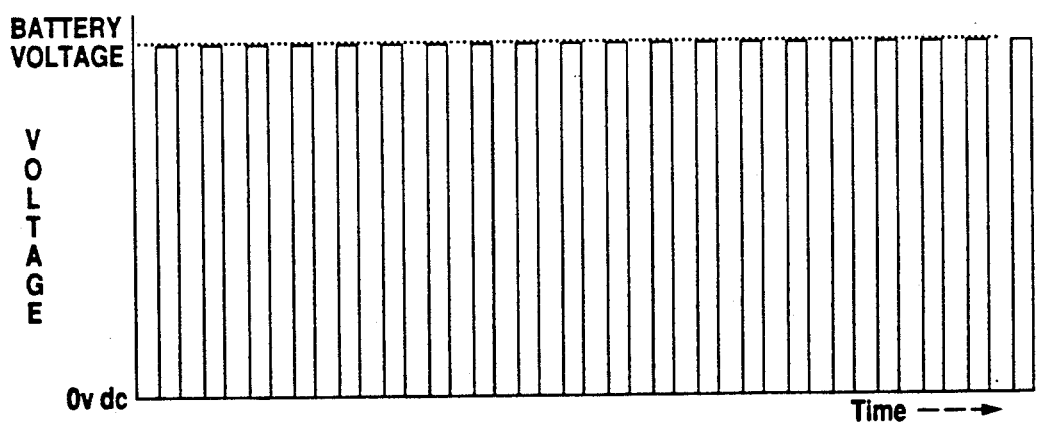
FIG. 7 is a graphic representation of a switching network control signal within a typical electrical current controller when the current powered device is in a normal, partial power, functional configuration.

FIG. 7 is a PWM waveform present in the type of solid state DC motor controller typically associated with the present invention, in response to a voltage signal such as that seen in FIG. 6 at J1. The analog voltage signal from the circuitry of the present invention is translated into a pulsed waveform in a typical DC control circuit, whose band width at the battery voltage level is inversely proportional to the voltage level provided by the governance circuitry at J1. Thus, a voltage level on the order of that shown in FIG. 6 will result in a pulsed waveform in a typical solid state DC motor controller circuit whose positive band widths proportionately reflect the analog voltage level.

Figure 8:
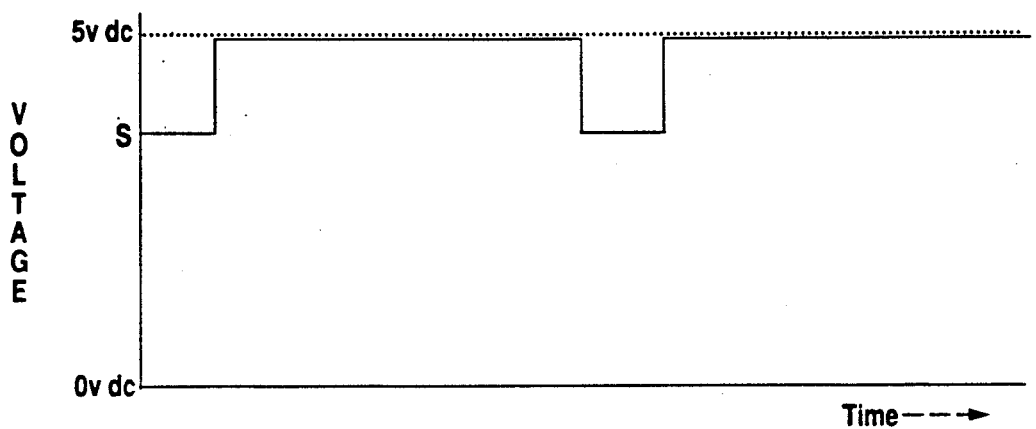
FIG. 8 is a graphic representation of the output from the circuitry of the present invention when controlled power limiting has been triggered.
Figure 9:
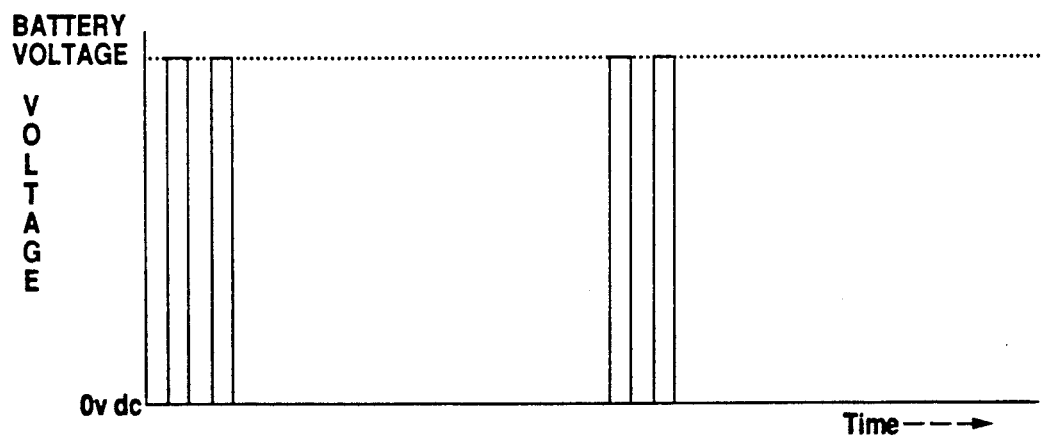
FIG. 9 is a graphic representation of a switching network control signal within a typical electrical current controller when controlled power limiting has been triggered.

When controlled power limiting is initiated, as described above, the governance circuitry of the present invention provides a voltage signal similar to that shown in FIG. 8. This voltage signal is a pulsed waveform that provides a 5 VDC value at J1 for a majority of the cycle time, and an analog voltage level (determined by the power level select circuitry) for a very small portion of the cycle. This reduces power to the motor without a sudden drop to zero power, and a sudden shutdown of the vehicle. The result, after this controlled power limiting signal is translated in a typical DC motor controller circuit, is shown by the waveform in FIG. 9. Therein, the pulsed waveform of FIG. 7 is "passed" only during the non-5 VDC window determined by the controlled power limiting circuitry. The MOSFET, SCR, or other switching devices which see the voltage waveform shown in FIG. 9, therefore, are conductive only during the windows created by the controlled power limiting circuitry. During these windows, the pulsed waveform is the same as that determined as before controlled power limiting by the power level selected. Thus, controlled power limiting allows for a dynamic decrease from any power level selected in the power level select circuitry, and prevents sudden changes in direction or overpower conditions.

Although the invention has ben described with reference to a specific embodiment, this description is not meant to be construed in a limiting sense. Various modifications of the disclosed embodiment, as well as alternative embodiments of the invention, will become apparent to persons skilled in the art upon reference to the description of the present invention. Any powered device which could benefit form the governing functions provided by the present would easily incorporate the circuitry of the present invention. As described above, the application of the present invention to other means for delivering power to a power consuming device, are simply analogous to the descriptions of the application of the present invention to the control in the preferred embodiment. It is therefore contemplated that the appended claims will cover such other applications that fall within the true scope of the invention.

I claim:

1. A power governance circuit for attachment to a power control circuit that requires an analog signal input that is characteristic of a desired action of a powered device under control, comprising:

a power level transition circuit capable of providing an analog signal to said power control circuit that is indicative of a power level at which said powered device is to function and that varies at a controlled rate;

a power level select circuit capable of providing an analog voltage to said power level transition circuit that is indicative of the power level at which said powered device is to function;

a controlled power limiting circuit capable of providing a variable voltage to said power control circuit that interacts with said power level transition circuit and interrupts said analog signal provided by said power level transition circuit to said power control circuit in a manner that provides a controlled decrease in said power level at which said powered device is to function when said decrease is demanded; and a power initiation reset circuit capable of providing a signal voltage to said power level transition circuit that allows said power level transition circuit to resume a controlled response to said power level select circuit after a period of time during which said controlled power limiting circuit has been interacting with said power level transition circuit.

2. The power governance circuit of claim 1 wherein said power level select circuit comprises:

an adder circuit capable of providing said analog voltage to said power level transition circuit in response to a cumulative voltage input, said cumulative voltage input being indicative of a desired power level of said powered device; a plurality of discrete power level circuits, each of said discrete power level circuits capable of affecting said cumulative voltage input to said adder circuit, said cumulative voltage input being indicative of said desired power level of said powered device; and an adder biasing circuit capable of establishing a minimum value of said cumulative voltage input to said adder circuit.

3. The power governance circuit of claim 1 wherein said controlled power limiting circuit comprises:

a pulse width modulator circuit capable of providing a variable voltage to said power control circuit that interacts with said power level transition circuit and interrupts said analog signal provided by said power level transition circuit in a manner that provides a controlled decrease in said power level at which said powered device is to function, said pulse width modulator circuit operating in response to an input signal indicating that said decrease is demanded;

a comparator circuit, said comparator circuit providing said input signal to said pulse width modulator circuit, said comparator circuit providing said input signal in response to a variable voltage level indicative of whether said decrease is demanded; and a plurality of controlled power limiting event circuits, each of said event circuits providing means for varying said variable voltage to said comparator circuit, said variable voltage indicative of whether said controlled decrease is demanded.

4. The power governance circuit of claim 1 wherein said power initiation reset circuit comprises means whereby said power level transition circuit is restored to a condition from which said power level transition circuit may respond to said analog voltage from said power level select circuit.

5. The power governance circuit of claim 2 wherein said plurality of discrete power level circuits comprises:

a low power circuit capable of alternately providing a zero voltage and a non-zero voltage to said adder circuit;

a medium power circuit capable of alternately providing a zero voltage and a non-zero voltage to said adder circuit; and a high power circuit capable of alternately providing a zero voltage and a non-zero voltage to said adder circuit;

wherein said zero voltages are indicative of said power level circuits being active, and said non-zero voltages are indicative of said power level circuits being inactive.

6. The power governance circuit of claim 3 wherein said plurality of controlled power limiting event circuits comprises:

a positive motion condition circuit which when activated by a positive motion condition in said powered device is capable of providing a resistance to ground which alone provides a voltage to said comparator circuit that prevents said comparator circuit from calling for controlled power limiting, but which in combination with another resistance to ground from a second of said plurality of controlled power limiting event circuits, provides a lower voltage to said comparator circuit that causes said comparator circuit to call for said controlled power limiting;

a negative condition circuit which when activated by a negative condition in said powered device is capable of providing a resistance to ground which alone provides a voltage to said comparator circuit that prevents said comparator circuit from calling for said controlled power limiting, but which in combination with another resistance to ground from said positive motion condition circuit, provides a lower voltage to said comparator circuit that causes said comparator circuit to call for said controlled power limiting;

an overpower condition circuit which when activated by an overpower condition in said powered device is capable of providing a resistance to ground which alone provides a voltage to said comparator circuit that causes said comparator circuit to call for said controlled power limiting; and an unsafe condition circuit which when activated by an unsafe condition in said powered device is capable of providing a voltage to said comparator circuit that prevents said comparator circuit from calling for said controlled power limiting.

7. A power governance circuit for attachment to a power control circuit that requires an analog signal input that is characteristic of a desired action of a powered device under control, comprising:

a power level transition circuit capable of providing an analog signal to said power control circuit that is indicative of a power level at which said powered device is to function and that varies at a controlled rate;

a power level select circuit capable of providing an analog voltage to said power level transition circuit that is indicative of the power level at which said powered device is to function, comprising:

an adder circuit capable of providing said analog voltage to said power level transition circuit in response to a cumulative voltage input, said cumulative voltage input being indicative of a desired power level of said powered device;

a plurality of discrete power level circuits, each of said discrete power level circuits capable of affecting said cumulative voltage input to said adder circuit, comprising:

a low power circuit capable of alternately providing a zero voltage and a non-zero voltage to said adder circuit;

a medium power circuit capable of alternately providing a zero voltage and a non-zero voltage to said adder circuit; and a high power circuit capable of alternately providing a zero voltage and a non-zero voltage to said adder circuit;

wherein, said zero voltages are indicative of said power level circuits being active, and said non-zero voltages are indicative of said power level circuits being inactive;

a controlled power limiting circuit capable of providing a variable voltage to said power control circuit that interacts with said power level transition circuit and interrupts said analog signal provided by said power level transition circuit to said power control circuit in a manner that provides a controlled decrease in said power level at which said powered device is to function when said decrease is demanded, comprising:

a pulse width modulator circuit capable of providing said variable voltage to said power control circuit that interacts with said power level transition circuit, said pulse width modulator circuit operating in response to an input signal indicating that said decrease is demanded;

a comparator circuit, said comparator circuit providing said input signal to said pulse width modulator circuit, said comparator circuit providing said input signal in response to a variable voltage indicative of whether said decrease is demanded; and a plurality of controlled power limiting event circuits, each of said event circuits providing means for varying said variable voltage to said comparator circuit, said variable voltage indicative of whether said controlled decrease is demanded, comprising;

a positive motion condition circuit which when activated by a positive motion condition in said powered device is capable of providing a resistance to ground which alone provides a voltage to said comparator circuit that prevents said comparator circuit from calling for controlled power limiting, but which in combination with another resistance to ground from a second of said plurality of controlled power limiting event circuits, provides a lower voltage to said comparator circuit that causes said comparator circuit to call for said controlled power limiting;

a negative condition circuit which when activated by a negative condition in said powered device is capable of providing a resistance to ground which alone provides a voltage to said comparator circuit that prevents said comparator circuit from calling for said controlled power limiting, but which in combination with another resistance to ground from said positive motion condition circuit, provides a lower voltage to said comparator circuit that causes said comparator circuit to call for said controlled power limiting;

an overpower condition circuit which when activated by an overpower condition in said powered device is capable of providing a resistance to ground which alone provides a voltage to said comparator circuit that causes said comparator circuit to call for said controlled power limiting; and an unsafe condition circuit which when activated by an unsafe condition in said powered device is capable of providing a voltage to said comparator circuit that prevents said comparator circuit from calling for said controlled power limiting; and a power initiation reset circuit capable of providing a signal voltage to said power level transition circuit that allows said power level transition circuit to resume a controlled response to said power level select circuit after a period of time during which said controlled power limiting circuit has been interacting with said power level transition circuit.

* * * * *